May 24, 1932.  H. T. KINGSBURY  1,860,251
LIGHTING SYSTEM FOR TOY AUTOMOBILES
Filed July 28, 1931   2 Sheets-Sheet 2
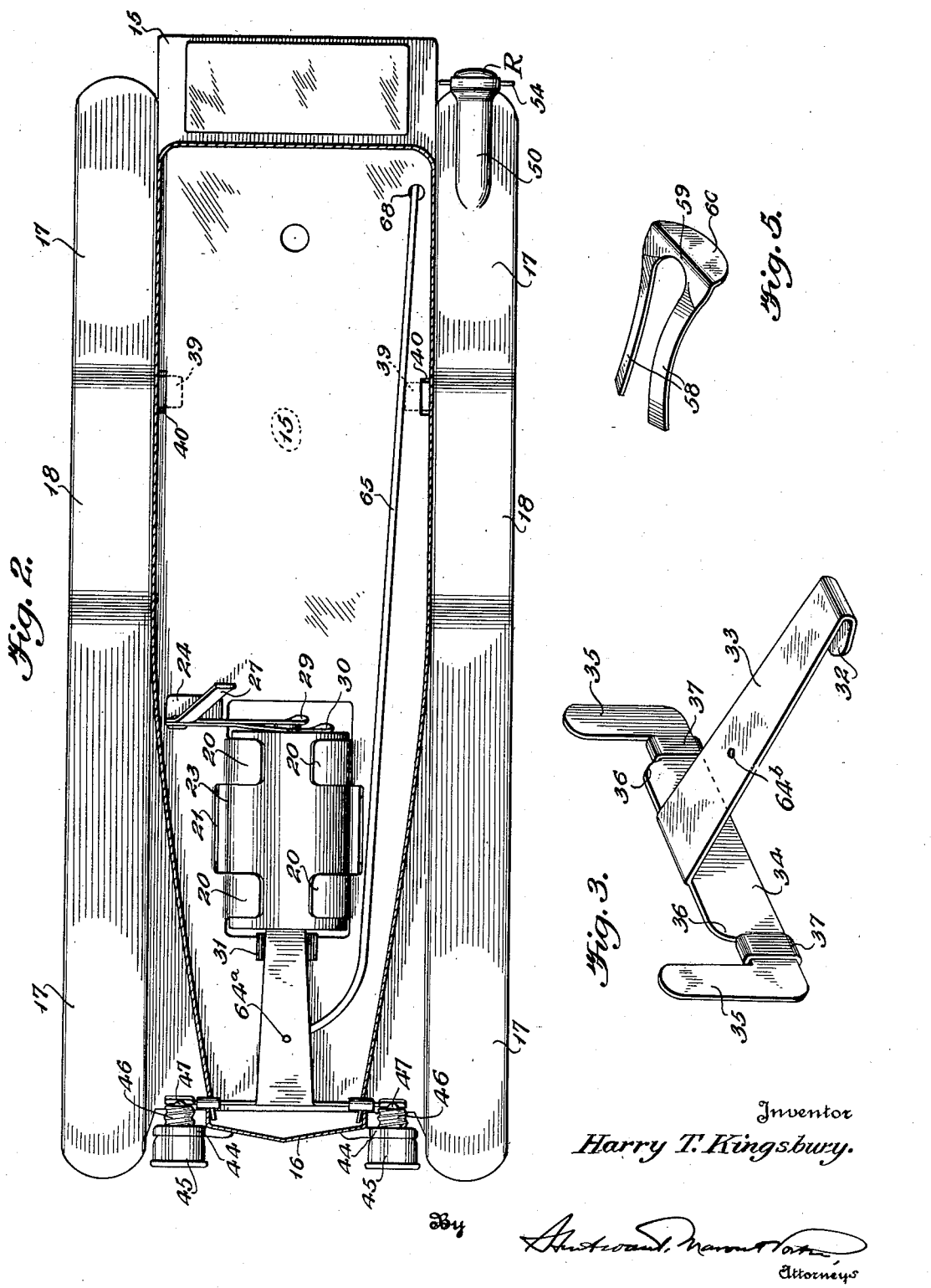
Inventor
Harry T. Kingsbury.
By
Attorneys Patented May 24, 1932

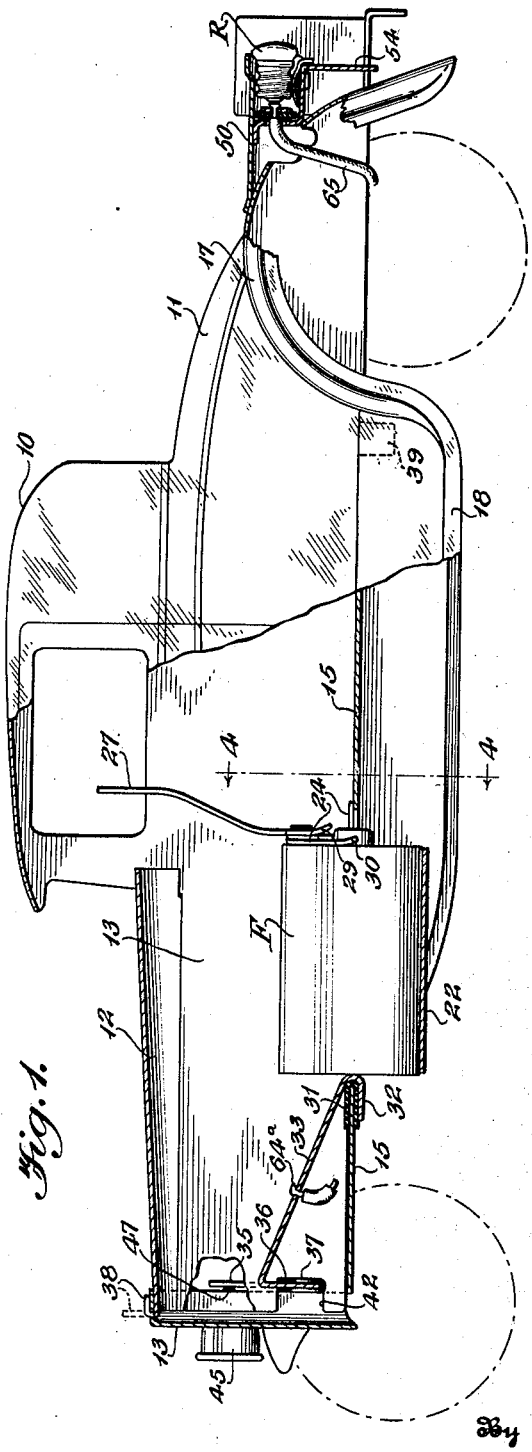

REISSUED 1,860,251

UNITED STATES PATENT OFFICE

HARRY T. KINGSBURY, OF KEENE, NEW HAMPSHIRE

LIGHTING SYSTEM FOR TOY AUTOMOBILES

Application filed July 28, 1931. Serial No. 553,695.

This invention relates to a lighting system for a toy automobile.

One of the features of the present invention is a lighting system employing a standard dry cell battery, in conjunction with certain novel structural elements by which current is conducted from the battery to the lights.

Another feature of the invention is a structural assemblage by which the battery supporting means operates in conjunction with the current conductors for supporting the battery and for conveying current to the several lights.

A further feature of the invention comprises the provision of a manually operable switch member for lighting and extinguishing the lights.

Still another feature of the invention is the provision of peculiar structural parts for supporting a light bulb and for conducting current to and from the same.

These and other objects of the invention are set forth in the following specification and claims, and one illustrative form of presenting the invention is represented on the accompanying drawings, in which:

Figure 1 is a side elevation, with parts broken away, of a toy automobile body;

Figure 2 is a horizontal section through the body;

Figure 3 is a perspective view of a conductor member for the front lights;

Figure 4 is a sectional view, on a slightly larger scale, substantially on line 4—4 of Figure 1;

Figure 5 is a perspective view of a securing and conducting clip for a rear light;

Figure 6 is vertical sectional view through a rear light construction.

In these drawings, the automobile body is illustrated as comprising a top 10, rear extension 11, front or hood extension 12 and sides 13. These elements may be formed of one or more pieces of sheet metal. The chassis is illustrated as comprising a deck piece 15 having integral therewith an upwardly turned dished front piece 16 constituting a radiator for the vehicle, and folded side portions which are elevated at their ends and curved to provide mudguards 17 and central running board portions 18.

A portion of the deck piece 15 is slit and cut away (Figures 1, 2 and 4) to provide a battery receiving opening, and the horizontal edges are bent to provide the curved upstanding ears 20 and the ledges 21 which are spaced from but parallel to the major portion of the deck 15 (Figure 4). A curved sheet metal member 22, having the radially outwardly directed horizontal flanges 23 is located in an accessible position beneath the deck and is held between the deck 15 and its ledges 21, and may be slid rearwardly and thus disengaged therefrom.

An angle bracket 24 is secured to the upper surface of the deck 15 opposite the rear end of the opening in the deck (Figure 2) and has a crank lever 27 mounted on its vertical portion, by means of a pivot connection 28. The vertical arm of the crank lever 27 extends upwardly within the body so that it may be operated by a finger passed through openings therein. The horizontal arm of the crank lever 27 has a downwardly and rearwardly curved end 29. The inner end of the bracket member 24 is arcuately cut away and preferably likewise has a downwardly and rearwardly curved end 30 for engaging the battery and resiliently forcing it forwardly.

A strip of insulating material 31 is folded around the front edge of the opening in the deck 15 (Figures 1 and 2) and receives a metal conductor member (Figure 3) having a rebent end 32 and an upwardly and forwardly inclined body portion 33 formed integral with a transverse extension 34 having upwardly directed resilient end tabs 35. Adjacent the end tabs, the width of the extension 34 is reduced to provide shoulders 36, between which and the tabs 35 are secured the insulating sleeves 37. The insulations 31 and 37 are preferably of gummed flexible material such as friction tape.

The front end of the hood piece 12, during manufacture, is provided with an upturned lug 38 (dotted lines, Figure 1) which may be inserted within a corresponding slot in the radiator section 16 of the chassis by holding the body at an acute angle with respect to the chassis. The body may then be rocked downward into position, and toward the end of this rocking movement the body tabs 39 are inserted into slots 40 in the outer edge of the deck 15. The tabs 39 may then be clinched against the bottom of the deck 15 to hold the body and chassis in assembled position. The lug 38 may then likewise be folded down (full line position, Figure 1).

The front ends of the side sheets 13 are provided with notches 42. During the above noted assemblage, the conductor 33, 34 will have already been assembled in the deck opening. As the body is rocked into position, these notches 42 will receive the insulated sleeves 37 and thus ultimately clamp the extension 34 in its proper transverse position in which the insulating sleeves prevent electrical contact of the extension with either the radiator section 16 or the side pieces 13, and the tabs 35 are located directly behind the threaded sockets 44 which are connected to the radiator member 16 (Figure 2). The sockets 44 are provided with headlight portions 45 at their front ends and are adapted to receive incandescent bulbs whose threaded portions 46 project through the rear thereof and present the central terminals 47 against the tabs 35.

On the left rear mudguard 17, in the illustrative form, is shown a rear light comprising an inverted U-shaped sheet metal member 50 arcuately cut away at its front end to conform substantially to the shape of the rear mudguard 17 (Figure 6) and having the tabs 51 which are inserted through slots 52 in the mudguard. The member 50 is finally joined to the mudguard as by a spot weld 53. Within this U-shaped member 50 is likewise secured a rebent sheet metal piece having a downwardly extending broadened portion 54 representing the license of an automobile, a horizontal portion 55 closing the bottom of the U-shaped member 50, an apertured vertical member 56 closing the cross section of the U-shaped member 50, and a horizontal portion 57 which may be joined to the U-shaped member by a spot weld. A separable spring clip (Figure 5) comprising the spaced resilient curved arms 58 and a body portion 59 having an angularly bent lip 60 may be placed in the cavity provided by the U-shaped member 50 and the closing portion 55. An incandescent bulb 61 may then be pushed into position so that it is held by the resiliency of the arms 58 with its central contact 62 resting against an upset end 63 of a conductor wire 64 having insulation 65 thereon. The bare end of the conductor wire 64 is passed through an insulated washer 66 which holds it in spaced relation from the walls of the aforesaid cavity and obstructs the passage of light through the aperture, and through a metal washer 67 for assuring contact with the incandescent bulb. The wire 64, 65 is passed beneath the mudguard and the deck 15 and upwardly through an opening 68 in the deck and forwardly until its front end 64a may be engaged in the hole 64b in the body portion 33 of the conductor.

In operation a standard flashlight cell F is normally located beneath the fingers 20 and is held in position by the sheet metal member 22 (Figure 4), the fingers 20 resiliently engaging the cell and preventing vibration thereof. The usual exposed zinc end of the cell is located at the front of the vehicle and in direct electrical contact with the body portion 33. The usual cardboard insulation C (Figure 4) on the cell prevents any grounding of the cell: and the shape of the bracket 24 prevents accidental grounding of the carbon terminal of the cell.

When it is desired to light the bulbs, the crank lever 27 is operated in a counterclockwise direction in Figure 4. The end 29 engages and moves onto the carbon terminal of the cell and thus establishes a circuit from the carbon terminal through the lower crank arm 27 to bracket 24 and thus to the chassis and body assemblage. Current is thus delivered to the screw threads of the front headlight bulbs, through the filaments of these bulbs to the central terminals 47 thereof, with a return through the tabs 35 and transverse extension 34 to body portion 33 and thus back to the zinc element of the cell. For the rear light, current passes through the mudguard 17 and the U-shaped member 50 to the threaded terminal of the rear bulb R, through the filament of this bulb, and thence back through conductor 64 to the body portion 33 of the conductor piece.

It will be noted that the bulbs may be easily replaced. The front or headlight bulbs are replaceable by unscrewing. The rear light bulb may be removed by engaging the thumbnail or a screwdriver point beneath the lip 60 and withdrawing the bifurcated member 58, 59, whereupon the rear bulb is free for removal. This rear bulb may be replaced by inserting the bifurcated member and bulb and forcing them into position. The battery F may be easily replaced by sliding the metal member 22 to the rear so that the battery cell may drop out of the chassis opening. A new cell may be substituted, and is positioned by engaging its exposed zinc end with the body portion 33 and pushing the cell into position while the end 30 of the bracket 24 yields resiliently and serves thereafter to hold the cell forwardly in its proper conductive relation with the body portion 33. The metal member 22 is then slid into position again.

It is obvious that the invention may be employed in other ways, without departing from the scope of the inventive claims.

What is claimed:

1. In a toy vehicle, a chassis assembly, a body assembly, a light support rigid with the chassis assembly, a light bulb in said support, a conductor member engaging the central terminal of said light bulb and including a member extending transversely of the vehicle, an insulating sleeve on said member, a battery having one of its terminals in conductive relationship with the chassis and body and the other terminal in conductive relationship with said conductor member, said body and chassis engaging said sleeve and holding said conductor member in position while insulated from said body and chassis.

2. In a toy vehicle, an apertured sheet metal member having fingers directed across the aperture and ledges located in a plane substantially parallel to the sheet, and a metal member having outwardly extending flanges for engagement between said sheet and said ledges, said member and fingers providing a seat for a battery.

3. In a toy vehicle, a sheet metal member having an aperture therein and provided with an upwardly bent front portion, a body having notches at its front end and fitting against said bent portion, a conductor member having a lateral extension arranged transverse to the vehicle, light sockets supported on said bent portion, light bulbs in said sockets having their central contacts engaged with said transverse extension, said transverse extension projecting between said bent portion and the body and being received within said notches, and insulating sleeves on said transverse member for supporting and insulating the same between said bent portion and said body.

4. In a toy vehicle, a chassis comprising an apertured sheet metal member having fingers directed across the aperture, means engageable with said sheet metal member for securing a battery between said means and said fingers, an insulating member at the front edge of said aperture, a conductor having a bent end mounted on said insulating member and extending upwardly, said conductor having a transversely directed extension with insulating sleeves thereon, a radiator portion rigid at the front edge of said sheet metal member and including a rearwardly directed flange opposite said insulating sleeves, light sockets mounted on said radiator portion, light bulbs in said sockets having their central terminals engaged with said transverse extension, and a body having notches at its front edge to fit around said insulating sleeves and to press the same against said flange whereby to maintain said conductor insulatedly in position.

5. In a toy vehicle, means for providing a conductive tube, an insulatably mounted contact in said tube, a light bulb in said tube having its base in conductive relation to said tube and its central terminal engaged with said insulated contact, and securing means slidable in said tube and including a body portion and spaced curved resilient arms for mechanically holding said light bulb in position in said tube.

6. A device as in claim 5, in which said body portion has a lip for limiting the inward movement of said body portion into said tube and for serving as a means of withdrawing said securing means from said tube.

7. In a toy vehicle, a chassis member having an aperture open to the exterior of the vehicle, inwardly curved fingers at the edges of said aperture, a battery in said aperture resting against said fingers, securing means on said chassis member for holding the battery upon said fingers, an insulating member at an edge of said aperture, a conductor member resting on said insulator and engaged with the zinc terminal of the battery, and a transversely extending bracket on said chassis member having a resilient extension engaged with the insulating compound of the battery and spaced from the carbon terminal thereof, said extension operating to hold the battery against said conductor.

8. In a toy vehicle, a chassis member having an aperture, a battery in said aperture, fingers limiting the inward movement of said battery, and removable means supported by the chassis member for holding the battery against said fingers.

9. In a toy vehicle, a chassis member having an aperture, a battery in said aperture, means on said member to hold the battery against movement into and out of said aperture, a conductor insulatedly supported on said member and engaged with the zinc terminal of said battery, a resilient member mounted on said chassis member and engaged with the insulation compound of said battery to hold the battery against said conductor member, and a pivotally mounted switch lever adapted to engage the carbon terminal of the battery for grounding said carbon terminal to the chassis member.

10. In a toy vehicle, a chassis member having an aperture, a battery adapted to be inserted in said aperture, fingers on said chassis member to limit the inward movement of the battery, removable securing means on the chassis member to prevent outward movement of the battery, a conductor insulatedly supported at one edge of the aperture for engagement with the zinc terminal of the battery, and a guide member engageable by the battery during insertion into the aperture for resiliently guiding the battery into engagement with said conductor.

11. In a toy vehicle, a chassis member providing a pocket to receive a battery, removable means supported by the chassis member to hold the battery in position in said pocket, a conductor engageable by the zinc terminal of said battery, an insulating member on said chassis member for supporting the conductor opposite the portion thereof engaged by said battery, and means on said chassis member for engaging the insulating compound of the battery and holding the battery against said conductor.

12. In a toy vehicle, a chassis member having an aperture and an upwardly directed portion providing a radiator section, a battery located in said aperture, a conductor member having one end bent around an edge of said aperture and extending forwardly toward said radiator section, said conductor member also having a transverse extension projecting beyond said radiator section with upwardly extending tabs at the ends thereof, light bulbs supported by and electrically connected to said radiator section, a body, an insulating member separating said conductor and said chassis at said bent end, insulating pieces on said extension gripped between said radiator section and body and insulating said extension therefrom, and means for electrically connecting the other terminal of the battery to the chassis member.

In testimony whereof, I affix my signature.

HARRY T. KINGSBURY.